(No Model.) F. C. VAN DOREN, Dec'd. 3 Sheets—Sheet 1.
C. A. COVERT, Administrator.
LIBRARY SHELF.

No. 425,117. Patented Apr. 8, 1890.

WITNESSES
Oscar A. Michel
E. L. Sherman

INVENTOR:
Frederick C. Van Doren,
by Drake & Co.

(No Model.) F. C. VAN DOREN, Dec'd. 3 Sheets—Sheet 2.
C. A. COVERT, Administrator.
LIBRARY SHELF.

No. 425,117. Patented Apr. 8, 1890.

WITNESSES: Oscar H. Michel, E. L. Sherman

INVENTOR Frederick C. Van Doren,
BY Drake & Co. ATTY'S.

(No Model.) F. C. VAN DOREN, Dec'd. 3 Sheets—Sheet 3.
C. A. COVERT, Administrator.
LIBRARY SHELF.

No. 425,117. Patented Apr. 8, 1890.

WITNESSES: INVENTOR

Oscar A. Michel. Frederick C. Van Doren.
E. L. Sherman. BY Drake & Co, ATTY'S.

UNITED STATES PATENT OFFICE.

FREDERICK C. VAN DOREN, OF NEWARK, NEW JERSEY; CHARLES A. COVERT ADMINISTRATOR OF SAID VAN DOREN, DECEASED.

LIBRARY-SHELF.

SPECIFICATION forming part of Letters Patent No. 425,117, dated April 8, 1890.

Application filed August 19, 1889. Serial No. 321,207. (No model.)

*To all whom it may concern:*

Be it known that I, FREDERICK C. VAN DOREN, a citizen of the United States, residing at Newark, in the county of Essex and State of New Jersey, have invented certain new and useful Improvements in Library-Shelves; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improvements in elevating shelves or boxes by means of a continuous or endless chain, rope, belt, or band operating in combination with wheels adapted for the purpose, together with shafts, cranks, tracks, and other necessary attachments, which will be hereinafter fully described and set forth.

The objects of my invention are, first, to provide a continuously ascending and descending series of shelves or boxes; second, to preserve their equilibrium and place rigidly at any angle while in motion or at rest, not only on the straight line of ascent and descent, but also at the turning-points at the top and bottom of the system, and, third, to bring any or each shelf down to any desired level to conveniently reach articles thereon instead of having to climb up to them. I attain these objects by the mechanism illustrated in the accompanying drawings, in which—

Figure 1:
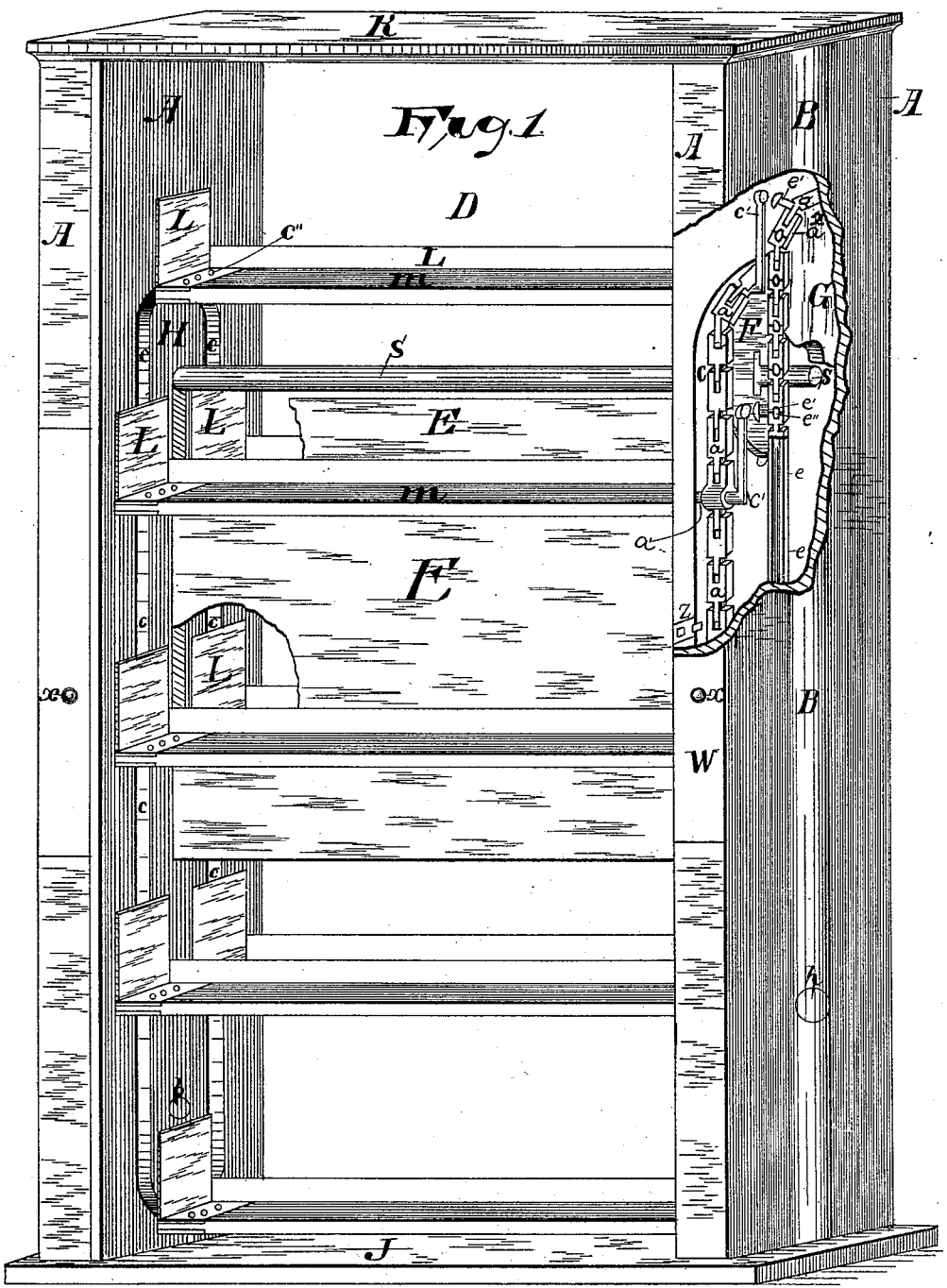
Figure 2:
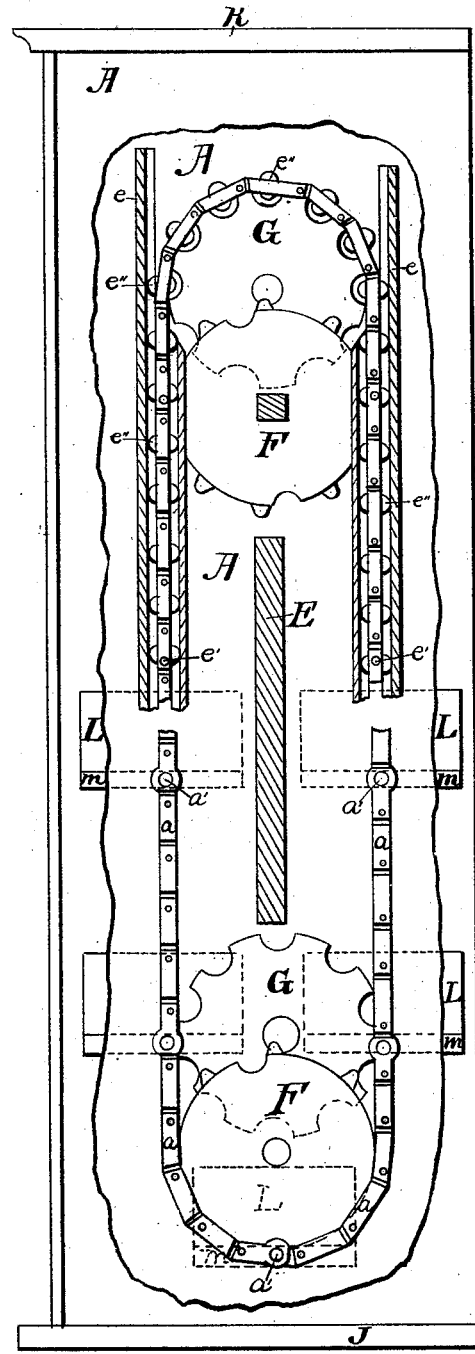
Figure 3:
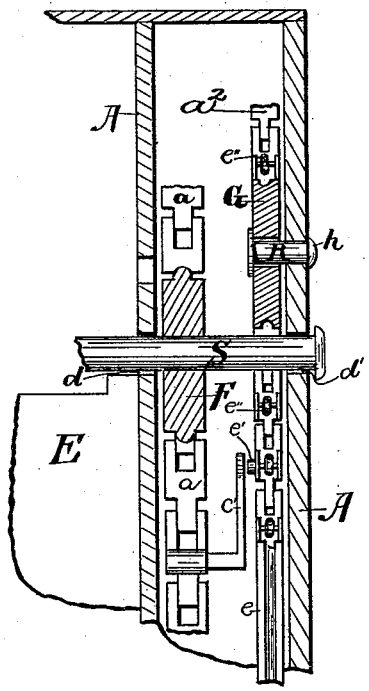
Figure 5:
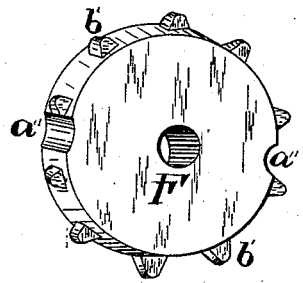
Figure 6:
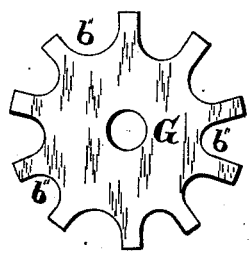
Figure 7:
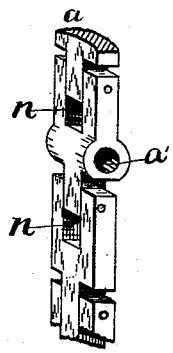
Figure 8:
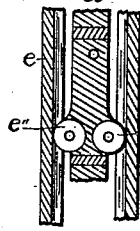
Figure 9:
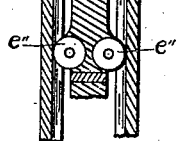
Figure 4:
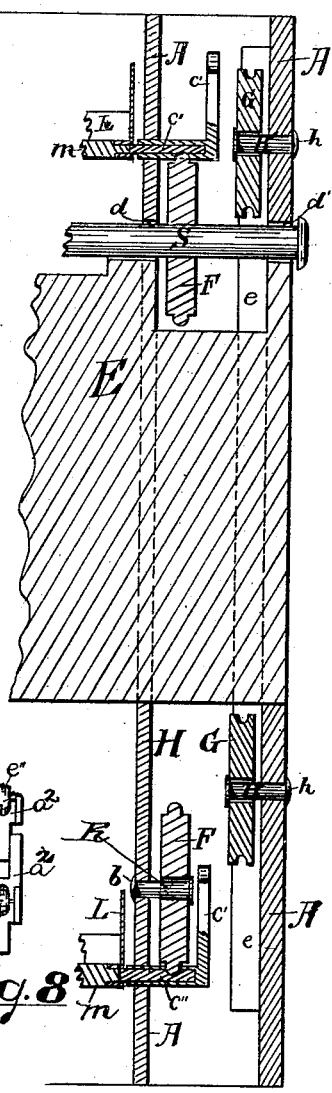

Figure 1 is a perspective view of the system of elevating shelves or boxes embodying my invention, with portions broken away. Fig. 2 is a left-hand end elevation of Fig. 1 from the shelf side with inner casing broken away, exposing the chains, wheels, and track, the upper half of the view showing the rear chain and track and lower half showing the forward chain. Fig. 3 is a top sectional longitudinal view of Fig. 2, both chains being shown as extended in proper place. Fig. 4 is an elevated edge view, in section, of right-hand end of the system, showing position of top supporting-shaft and smaller shafts, central brace, crank-connections for shelves and chains, and the bearings and adjustment of wheels and shafts. Fig. 5 shows forward wheels. Fig. 6 shows rear wheels. Fig. 7 shows an enlarged section of the forward chain with shelf-link. Fig. 8 shows crank-connecting link, with pivotal pin and guide-wheels attached, of the rear chains. Fig. 9 is a longitudinal section of Fig. 8 with track added.

The description herein is to be taken as applying to both sides of the system.

Similar letters refer to similar parts throughout the several views.

The casing A, the top K, the bottom J, the back D, the central brace E, together with the studding or post B, as shown in Fig. 1, constitute the frame-work of the system, which can be made stationary or movable, as desired. The post B can be dispensed with in light constructions. It is designed as a firm support, against which or into which to firmly secure central brace E. The central bracing E must pass entirely through the system, centrally between the shelves M and between upper and lower system of wheels F and G, through center of core H, and be firmly secured either in post B or outer casing A, as shown in Figs. 1, 2, and 4. The supporting-shaft S passes entirely through the system at the top, centrally on a line with central brace E and just above it, revolving on a bearing on central brace E at $d$ and in a bearing in outer casing A at $d'$, as shown more clearly in Figs. 3 and 4. To this supporting-shaft S are firmly secured the two upper forward wheels F on both sides of the system just inside the inner casing A, as shown in Figs. 3 and 4. The top shaft S and two upper forward wheels F, together with the central brace E, firmly secured in outer casing A or post B, support the weight of the shelves M when connected to them; also, the top shaft S transmits motion from side to side of the system by revolving in its bearings at $d$ and $d'$, the two upper forward wheels F revolving with shaft S, being secured to it.

An opening $c$ cut in the inner casing A on a line with forward chain $a$ in its revolution, as clearly shown in Fig. 1, makes a passageway for connecting-crank $c'$ and shelf-piece $c''$ to pass through openings in forward chains $a$ at $a'$ to reach shelves M, this opening $c$ to be only large enough to accommodate crank $c'$ and shelf-piece $c''$ with the least friction. By the cutting of this opening $c$ in the inner casing A for the crank-connections to reach the shelves, the central portion is detached from the rest of the casing and forms a core H. This core H is fitted to and held in position by the central brace E on the same line with the rest of the inner casing, said brace E passing vertically through the core H and firmly secured in outer casing A. This is partly shown in Fig. 1 to the left of the figure and more clearly shown in Fig. 4.

In the outside casing A, at $h$, directly in the rear and on a line with shaft S, but raised above it, are placed short shafts R', firmly secured in casing A, to form a bearing on which revolve the rear wheels G, care being taken to clear the shaft S with the revolution of wheels G, as shown more clearly in Fig. 4. The wheels G at the bottom of the system being placed in the same relative position to the forward shaft and wheels as at the top, the chains $a$ and $a^2$ are made of built-up links, as shown in the drawings, or of rope, band, or belt. The forward chains $a$ are provided with suitable openings in the side or edge of shelf-bearing links only, (seen more clearly at $a'$ in Fig. 7,) to receive one end of connecting cranks $c'$ and shelf-pieces $c''$. Such openings are regulated by the distance apart desired for shelves M, allowing sufficient head room to prevent interference at turning-points at top and bottom of the system. The openings N through face of forward chains, as shown more clearly in Fig. 7, fit over and around projections on wheels F, as shown at $b'$, Fig. 5, and prevent slipping of the chains. Each crank-bearing link in forward chains $a$ is made thicker than the other links, as seen more clearly at $a'$, Fig. 7, to provide sufficient room for the opening at $a'$ without weakening the link, and this increased width falls into a corresponding depression in wheels F, as seen at $a''$, Fig. 5. On the rear chains $a^2$, instead of openings, as at $a'$, in forward chains, are placed pins $e'$, (more clearly shown in Fig. 8,) secured to links at the same distances apart as the openings at $a'$. On these pins $e'$ are pivoted the vertical portions of connecting-cranks $c'$, as shown more clearly in Figs. 1 and 3, the upper ends of cranks $c'$ being provided with openings for this purpose; also on rear chains $a^2$ on both upper and under sides of links, on each link, or at such distances apart as may be found necessary, are secured small guide wheels or rollers $e''$, (more clearly shown in Figs. 8 and 9,) which fall into depressions provided in wheels G for this purpose, as shown at $b''$, Fig. 6. The rear chains, acting only as guiding ones, can be of lighter construction than forward chains. The four chains $a$ and $a^2$ are to be of an exact length with each other, passing over the upper set of wheels F and G at the top of the system, and under the lower set, and the ends of chains joined together, thus making of each an endless or continuous chain. The rear chains $a^2$ should work perfectly free over and under wheels G, and through track $e$, formed on the inner side of the outer casing A.

Other styles of chains and wheels may be used than those shown in the drawings, and in that case chains and wheels must reciprocally correspond, the principle remaining unchanged.

The connecting-cranks $c'$ and shelf-piece $c''$ pass through the openings $c$ and through the opening at $a'$ in the forward chains $a$, revolving in said openings in the link at $a'$, and are telescoped into each other and firmly fastened together, forming one solid piece, as more clearly shown in Fig. 4. One end of shelf-piece $c''$ is fitted with a shoe, which is firmly secured to shelves M, and when thus joined together crank $c'$, shelf-piece $c''$, and shelf M form one rigid piece with vertical portion of crank $c'$ inside the casings A and between forward and rear chains, as seen in Figs. 1 and 3.

L is end and back pieces for shelves M to prevent articles from pushing against the casings or central brace. They can extend all around the shelves M, if necessary, as shown in Figs. 1 and 2. A track $e$ is securely built against the inside of outer casing A, into or against which run the guide wheels or rollers $e''$ on rear chains $a^2$, built so as to allow guide wheels or rollers $e''$ on both upper and under sides of the links to run into or against it to prevent any sagging or side motion of rear chains $a^2$ on the line of ascent or descent, as shown clearly in Figs. 2 and 9. If preferred, the track $e$ can be built across the ends, both at the top and bottom of the system, on a curved line to correspond with wheels G, thus allowing the guide wheels or rollers $e''$ to run into or over it on the ends as well as the straight line, and when track $e$ is so constructed wheels G can be dispensed with. The vertical portion of connecting-crank $c$ must be the same length as the elevation of rear wheels G above forward wheels F between centers. The bearings of crank-connections $c'$ and shelf-piece $c''$ through forward chains $a$ at $a'$ must allow said cranks to revolve easily in such bearings, but without lost motion. The same also applies to the pivotal-pin connection $e'$ on rear chains to prevent wabbling of the shelves M.

All bearings, both of shafts and wheels, should be smooth and true to insure proper working with the least friction and noise.

Doors are provided in the edge of casings A to obtain access to the inside, as seen at W, Fig. 1. $x$ are knobs on same.

A lock is placed against the inside of inner casing A, as seen at Z in Fig. 1, controlled by a spring or other device, and operated through an opening in the edge of casing A, designed to stop and hold shelves M at any level by pushing the bolt or spring into one of the openings N on forward chains $a$. (Shown more clearly in Fig. 7.)

Doors or curtains can be provided for the front of the system, or it can be left open, if preferred.

The drawings show only eight shelves; but the system can be built from the cellar to the roof, if desired, and any number of shelves or boxes employed at any angle, provided the necessary strength be obtained in construction to sustain the weight. Power other than by hand can also be used to turn or work the system by extending shaft S beyond the outer casing A at D′, and attaching thereto a driving-wheel and belt-connections with any system of power.

When all the parts of frame-work have been set up, and wheels F and G, shafts S, $b$, and R, chains $a$, connecting-cranks $c'$, and shelf-piece $c''$, together with track $e$, carefully placed in position and adjusted, then firmly secure shelves M to the shoe end of shelf-piece $c''$, as shown in Fig. 1, thus connecting the system with shelves M.

By simply applying the hand to one of the shelves M they are made to pass up and down and around at either end, always maintaining rigidly the angle of adjustment to crank $c'$ and shelf-pieces $c''$ at every point of the system. Thus I have provided a most convenient receptacle for books (as a library-case) or other articles that are placed on shelves or in boxes and which require the aid of a step or ladder to reach the top shelves or boxes. I obviate the necessity of climbing up to reach them by my invention, which allows the shelf or box to be brought down to any level without disturbing in the least the contents, and stopped and held at the pleasure of the operator.

Having thus described my invention, what I desire to claim as new and to secure by Letters Patent is—

1. In a system for elevating shelves or boxes, the combination, with the frame thereof, of the shelves M, adapted to be arranged and maintained fixedly at any desired angle, shelf-pieces $c''$ and connecting-cranks $c'$, chains $a$, and chains $a^2$, carrying pins $e'$, all said parts being arranged with relation to one another and operating, as shown and described for the purposes set forth.

2. In a system for elevating shelves or boxes, adapted to be arranged at any fixed angle, the combination of endless chains $a$, having therein openings $a'$ and $n$, shelf-pieces $c''$, journaled in said openings $a'$, wheels F F, having projecting knobs, endless chains $a^2$, having thereon pivotal pins $e'$ and guide-wheels $e''$, cranks $c'$, connected with or pivoted on said pins $e'$, wheels G G, and guiding-track $e$, all said parts being arranged with relation to one another and operating as shown and described, for the purposes set forth.

3. In a system for elevating shelves or boxes, adapted to be arranged at any fixed angle, the combination of wheel F, shaft S, carrying said wheel and revolving therewith at the top of said system, core H, short shaft $b$, located at the lower part of said core, a wheel revolving on said shaft, the endless chain $a$, short shafts R at the top and bottom of the system, wheels G G, arranged to revolve on said shafts R, and endless chains $a^2$, all said parts being arranged in relation to one another and operating as shown and described, for the purposes set forth.

4. In a system for elevating shelves or boxes, the combination of shelves M, adapted to be maintained fixedly at any desired angle, the chain $a^2$, a guiding-track $e$, built against the inner sides of the outer casing A and projecting inward from the casing on both sides of said chain $a^2$, and the guiding-wheels $e''$, carried by said chain $a^2$, all said parts being arranged with relation to one another and operating as shown and described, for the purposes set forth.

5. In a system for elevating shelves or boxes, the combination, with the frame thereof, of wheels F and G, chains $a$ and $a^2$, guiding-track $e$, shafts S, $b$, and R, crank-connections $c'$, shelf-pieces $c''$, and shelves M, all said parts being arranged with relation to one another and operating as shown and described, for the purposes set forth.

In testimony that I claim the foregoing I have hereunto set my hand this 7th day of January, 1889.

FREDERICK C. VAN DOREN.

Witnesses:
FANNIE E. TRAPHAGEN,
ALFRED GARTNER.